(12) United States Patent
Rhee

(10) Patent No.: US 9,480,272 B2
(45) Date of Patent: Nov. 1, 2016

(54) GERMINATING DEVICE FOR RAW COFFEE BEANS AND GERMINATING METHOD USING SAME

(76) Inventor: Sangwon Rhee, Seoul (KR)

( * ) Notice: Subject to any disclaimer, the term of this patent is extended or adjusted under 35 U.S.C. 154(b) by 610 days.

(21) Appl. No.: 13/981,525

(22) PCT Filed: Jan. 19, 2012

(86) PCT No.: PCT/KR2012/000459
§ 371 (c)(1),
(2), (4) Date: Jul. 24, 2013

(87) PCT Pub. No.: WO2012/102515
PCT Pub. Date: Aug. 2, 2012

(65) Prior Publication Data
US 2013/0302484 A1 Nov. 14, 2013

(30) Foreign Application Priority Data

Jan. 25, 2011 (KR) .......................... 10-2011-0007478
Jan. 13, 2012 (KR) .......................... 10-2012-0004337

(51) Int. Cl.
*A23F 5/02* (2006.01)
*A01C 1/02* (2006.01)

(52) U.S. Cl.
CPC .. *A23F 5/02* (2013.01); *A01C 1/02* (2013.01)

(58) Field of Classification Search
CPC .............. A23F 5/02; A01C 1/00; A01C 1/02;
A01G 7/045; A01G 31/02; Y02P 60/216
See application file for complete search history.

(56) References Cited

FOREIGN PATENT DOCUMENTS

| JP | WO2008209578 | 3/2008 |
| KR | 1020110031299 | 3/2011 |

*Primary Examiner* — Steven Leff
(74) *Attorney, Agent, or Firm* — Schacht Law Office, Inc.; Dwayne Rogge

(57) ABSTRACT

Disclosed herein are a germination apparatus for raw coffee beans and a germination method of raw coffee beans using the same that are capable of germinating a large amount of raw coffee beans within a short period of time, thereby remarkably increasing the content of γ-aminobutyric acid (GABA).

3 Claims, 9 Drawing Sheets

GERMINATING DEVICE FOR RAW COFFEE BEANS AND GERMINATING METHOD USING SAME

BACKGROUND OF THE DISCLOSURE

1. Field of the Disclosure

The present disclosure relates to a germination apparatus for raw coffee beans and a germination method of raw coffee beans using the same that are capable of germinating a large amount of raw coffee beans within a short period of time, thereby remarkably increasing the content of γ-aminobutyric acid (GABA).

A germination apparatus for raw coffee beans that is capable of remarkably increasing the content of γ-aminobutyric acid (GABA) is disclosed. In accordance with an aspect of the present disclosure, there are provided a germination apparatus for raw coffee beans including a water tank to store water, a first heater installed in the water tank to heat the water, a magnetized water generator connected to the water tank to magnetize the water supplied from the water tank, a germination tank having an introduction port connected to the magnetized water generator such that an interior of the germination tank is filled with the water supplied from the magnetized water generator, the germination tank discharging the water supplied from the magnetized water generator to the water tank through a discharge port, a shower device installed in the germination tank, the shower device being connected to the magnetized water generator to spray the water supplied from the magnetized water generator into the germination tank, a germination container disposed in the germination tank to receive raw coffee beans, and a circulation pump to circulate the water and a germination method of raw coffee beans using the same.

2. Description of the Related Art

It is well known that germinated products are good for health. A fact that all seeds exhibit superlative nutritive value when the seeds are germinated has become public knowledge according to research results published by the Max Planck Institute in Germany in 1993.

For example, when unpolished rice is cooked, bioavailability of nutrients of the unpolished rice is low. When unpolished rice is germinated and the germinated rice is cooked, on the other hand, nutrients of the germinated rice are increased in large amounts and bioavailability of the nutrients of the unpolished rice becomes high.

When unpolished rice is germinated, γ-aminobutyric acid (GABA) is increased by 5 to 10 times. γ-aminobutyric acid (GABA) increases oxygen supply to the brain, accelerating brain cell metabolism and effectively removing plaque from clogged arteries, thereby preventing high blood pressure and achieving stress relief and mental stability through stabilization of the nervous system.

As described above, nutrients of a seed are increased in large amounts when the seed is germinated. For example, when raw coffee beans are germinated, dried, and roasted to manufacture coffee beans, γ-aminobutyric acid (GABA) is increased by 2 to 3 times and caffeine is reduced. In addition, during manufacture of premium coffee in advanced European and American countries, raw coffee beans are washed to remove impurities from surfaces of the raw coffee beans generated during harvesting and drying of the raw coffee beans. During germination of the raw coffee beans, the raw coffee beans are washed using magnetized water to obtain pure and clean coffee beans.

In the related art, raw coffee beans are washed and then soaked in room temperature (20° C.) water supplied into a germination tank for a predetermined period of time such that the raw coffee beans are germinated. In this case, the raw coffee beans are exposed to a wet environment for a long period of time with the result that germs rapidly propagate in the raw coffee beans, bad smells are generated from the raw coffee beans, and a germination rate of the raw coffee beans is lowered.

In order to solve the above problems, the inventor of the present application filed a patent application for an disclosure related to a germination apparatus for raw coffee beans capable of remarkably increasing the content of γ-aminobutyric acid (GABA) (Korean Patent Application Publication No. 10-2011-0031299 published on Mar. 25, 2011). The disclosure disclosed in the above Korean patent application publication has the effect of reducing germination time of the raw coffee beans using properties of magnetized water. Nevertheless, the inventor of the present application has conducted research and development of technology for more effectively germinating raw coffee beans. The present disclosure has been completed based on such research and development.

SUMMARY OF THE DISCLOSURE

Therefore, the present disclosure has been made in view of the above problems, and it is a first object of the present disclosure to provide a germination apparatus for raw coffee beans that is capable of germinating a large amount of raw coffee beans within a short period of time.

It is a second object of the present disclosure to provide a germination apparatus for raw coffee beans and a germination method of raw coffee beans using the same that are capable of removing foreign matter from raw coffee beans using ultrasound, restraining propagation of germs in the raw coffee beans using chitosan, and preventing valuable ingredients, such as water-soluble amino acids and γ-aminobutyric acid (GABA), newly generated and increased during germination of the raw coffee beans from being dissolved using edible acid water in order to further improve germination conditions of the raw coffee beans, thereby remarkably improving germination quality of the raw coffee beans and nutrients of the raw coffee beans and, in addition, minimizing germination time of the raw coffee beans.

In accordance with an aspect of the present disclosure, the first object can be accomplished by the provision of a germination apparatus for raw coffee beans including a water tank to store water, a first heater installed in the water tank to heat the water, a magnetized water generator connected to the water tank to magnetize the water supplied from the water tank, a germination tank having an introduction port connected to the magnetized water generator such that an interior of the germination tank is filled with the water supplied from the magnetized water generator, the germination tank discharging the water supplied from the magnetized water generator to the water tank through a discharge port, a shower device installed in the germination tank, the shower device being connected to the magnetized water generator to spray the water supplied from the magnetized water generator into the germination tank, a germination container disposed in the germination tank to receive raw coffee beans, and a circulation pump to circulate the water.

The germination apparatus for raw coffee beans may further include a second heater installed in the germination tank to heat the interior of the germination tank.

The germination apparatus for raw coffee beans may further include a mixing pump to fluctuate the water supplied from the magnetized water generator such that upper and lower portions of the water are mixed with each other while being moved downward and upward when the interior of the germination tank is filled with the water.

The germination apparatus for raw coffee beans may further include a filter to remove impurities contained in the water.

The germination apparatus for raw coffee beans may further include a controller to control operations of the first heater, the shower device, and the circulation pump.

The germination apparatus for raw coffee beans may further include a temperature sensor installed at least one selected from between the water tank and the germination tank.

The germination apparatus for raw coffee beans may further include a switching valve disposed between the magnetized water generator and the germination tank to switch a travel course of the water discharged from the magnetized water generator to the germination tank or the shower device.

The germination apparatus for raw coffee beans may further include a drainage valve disposed between the germination tank and the water tank to drain the water discharged from the germination tank outside.

The germination apparatus for raw coffee beans may further include a partition wall to partition the interior of the germination tank into a plurality of unit spaces in a vertical direction, wherein the germination container may include a plurality of germination containers disposed in the respective unit spaces.

The partition wall may be configured to have a mesh structure such that the water passes through the partition wall.

The germination container may be configured to have a mesh structure such that the water passes through the germination container.

The introduction port may be located at an upper part of the germination tank and the discharge port may be located at a lower part of the germination tank.

The magnetized water generator may include a housing, through which the water passes, and a plurality of permanent magnets arranged along an inner circumference of the housing.

In accordance with another aspect of the present disclosure, the second object can be accomplished by the provision of a germination apparatus for raw coffee beans including a water tank having a first heater mounted therein, the first heater heating water according to a control signal from a controller in a case in which the temperature of the water is lower than reference water temperature when the temperature of the water is measured using a temperature sensor, a magnetized water generator connected to the water tank to magnetize water supplied from the water tank, a circulation pump to circulate the magnetized water supplied from the magnetized water generator, a switching valve to switch a channel to directly supply the magnetized water received from the circulation pump into a germination tank or to supply the magnetized water received from the circulation pump to a magnetized water discharger installed in an upper part of the germination tank, the germination tank to receive the magnetized water from the switching valve until the magnetized water fills the germination tank such that raw coffee beans are fully soaked in the magnetized water to germinate the raw coffee beans, a drainage valve configured to be opened or closed as needed to drain the magnetized water discharged from the germination tank outside or to circulate the magnetized water discharged from the germination tank, a filter to remove foreign matter from the magnetized water circulated via the drainage valve and to supply the filtered magnetized water to the water tank, and a controller to control operations of the first heater installed in the water tank, the circulation pump, the switching valve, a second heater, a mixing pump, and an ultrasound generator installed in the germination tank, and the drainage valve, wherein the germination tank includes a partition wall to partition an interior of the germination tank into a plurality of unit spaces, the partition wall being configured to have a mesh structure, a germination container installed at a top of the partition wall to receive raw coffee beans, the germination container being configured to have a mesh structure, a magnetized water discharger provided in an upper part of the germination tank to spray the magnetized water to the raw coffee beans received in the germination container, the ultrasound generator provided at a sidewall of the germination tank to stimulate the raw coffee beans received in the germination containers using ultrasound, the second heater installed in a lower part of the germination tank to heat water according to a control signal from the controller in a case in which the temperature of the water is lower than reference water temperature when the temperature of the water is measured using the temperature sensor, a chitosan supply tank connected to an injection port formed at the sidewall of the germination tank to supply chitosan from outside to the germination tank, and the mixing pump to circulate the magnetized water filling the germination tank.

In accordance with a further aspect of the present disclosure, the second object can be accomplished by the provision of a germination method of raw coffee beans including filling a germination container of a mesh structure installed in a germination tank with raw coffee beans, supplying water to a water tank and heating the water using a first heater, allowing the water supplied from the water tank to pass through a magnetized water generator to generate magnetized water, injecting the magnetized water into the germination tank such that the raw coffee beans are fully soaked in the magnetized water, germinating the raw coffee beans at a temperature of 40.1 to 85° C. for 3 to 9 hours, and discharging the magnetized water, wherein the raw coffee beans are germinated using weakly acidic magnetized water such that water-soluble amino acids and γ-aminobutyric acid (GABA) generated during germination of the raw coffee beans are not dissolved in the magnetized water to prevent the water-soluble amino acids and γ-aminobutyric acid (GABA) from being discharged together with the magnetized water at the step of discharging the magnetized water, thereby accelerating germination of the raw coffee beans.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF THE PREFERRED EXAMPLES

Now, preferred examples of the present disclosure will be described in detail with reference to the accompanying drawings.

FIGS. 1 to 5 show a germination apparatus for raw coffee beans according to a first example of the present disclosure to accomplish the first object of the present disclosure.

Figure 1:
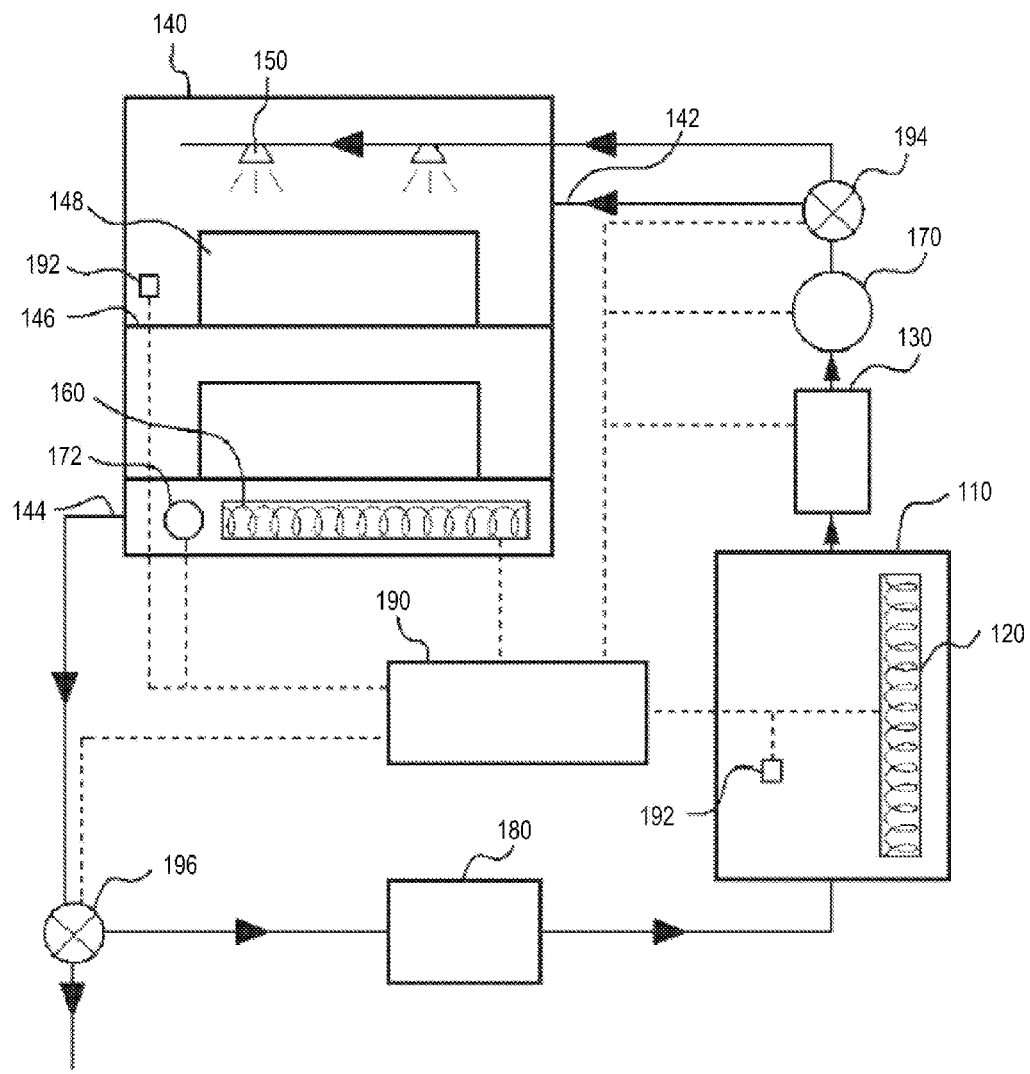
FIG. 1 is a schematic view showing a germination apparatus for raw coffee beans according to a first example of the present disclosure.

FIG. 1 is a schematic view showing a germination apparatus 100 for raw coffee beans according to a first example of the present disclosure.

As shown in FIG. 1, the germination apparatus 100 for raw coffee beans according to the first example of the present disclosure includes a water tank 110, a first heater 120, a magnetized water generator 130, a germination tank 140, germination containers 148, shower devices 150, a second heater 160, a circulation pump 170, a mixing pump 172, a filter 180, a controller 190, a temperature sensor 192, a switching valve 194, and a drainage valve 196.

In the germination apparatus 100 for raw coffee beans according to the first example of the present disclosure to accomplish the first object of the present disclosure, water is magnetized by the magnetized water generator 130, the magnetized water is supplied to raw coffee beans 10, and germination temperature of the raw coffee beans 10 is adjusted by the first heater 120 and the second heater 160. As a result, a large amount of the raw coffee beans 10 may be effectively germinated within a short period of time.

Furthermore, in the germination apparatus for raw coffee beans 100 according to the first example of the present disclosure to accomplish the first object of the present disclosure, impurities contained in circulated water are removed by the filter 180. As a result, contaminants and caffeine may be effectively removed from the surfaces of the raw coffee beans 10. In addition, propagation of germs in the raw coffee beans 10 may be effectively prevented.

Hereinafter, the respective components of the germination apparatus 100 for raw coffee beans according to the first example of the present disclosure to accomplish the first object of the present disclosure will be described in more detail with reference to FIGS. 1 to 5.

The water tank 110 stores water. As shown in FIG. 1, the first heater 120 to heat water may be installed in the water tank 110. Water may be heated by the first heater 120 and the heated water, i.e. the water of increased temperature, may be supplied to the germination tank 140 via the magnetized water generator 130.

In order to adjust temperature of the water, as shown in FIG. 1, the temperature sensor 192 may be installed in the water tank 110. In a case in which the temperature sensor 192 is installed in the water tank 110 together with the first heater 120 as described above, the temperature of the water may be maintained such that the temperature of the water is suitable for germination of the raw coffee beans 10.

Figure 2:
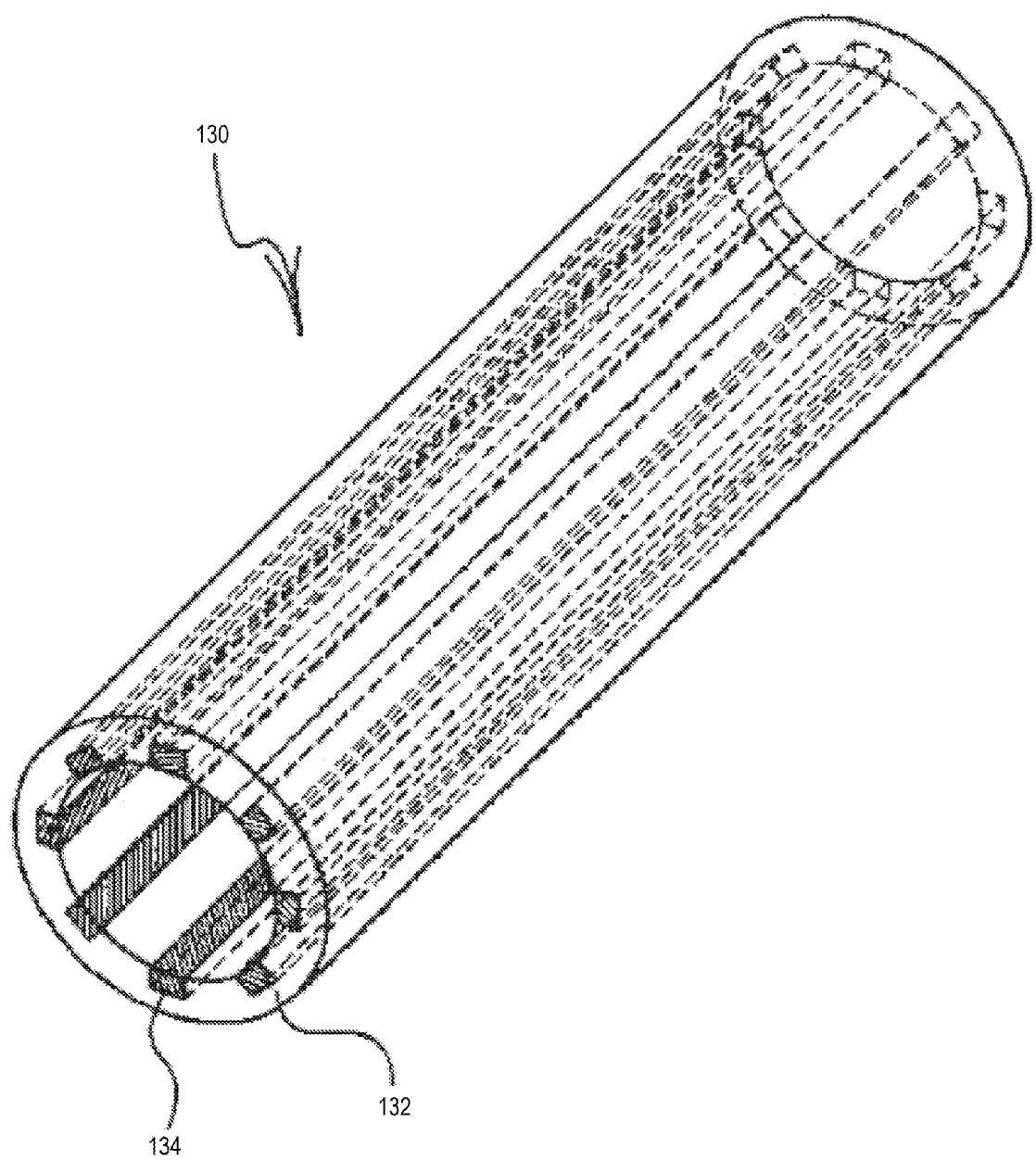
FIG. 2 is a perspective view showing the interior structure of a magnetized water generator of the germination apparatus for raw coffee beans according to the first example of the present disclosure.

As shown in FIG. 1, the magnetized water generator 130 may be connected to the water tank 110 to magnetize water supplied from the water tank 110. More specifically, as shown in FIG. 2, the magnetized water generator 130 may include a housing 132, through which water passes, and a plurality of permanent magnets 134 arranged along an inner circumference of the housing 132 in a circumferential direction of the housing 132.

Each permanent magnet 134 may have a magnetic intensity of 6,000 to 10,000 gauss. For example, a neodymium magnet may be used as each permanent magnet 134. Each permanent magnet 134 may be formed in a pillar shape such that each permanent magnet 134 is mounted in a corresponding groove formed in the inner wall of the housing 132. In this case, the permanent magnets 134 may be arranged such that an N pole of each permanent magnet 134 is directed to a central axis of the housing 132.

A magnetic field may be generated in the housing 132 by the permanent magnets 134 disposed in the housing 132 as described above. When water passes through the housing 132 in a state in which the water is perpendicular to the magnetic field, the water may be magnetized with the result that particles of the water may be minutely decomposed. Consequently, the molecular structure of the water may be changed and, therefore, the water may have, for example, a hexagonal water structure.

The magnetized water, generated by the magnetized water generator 130, may contain plenty of dissolved oxygen, further activate mineral ions in the water, exhibit alkaline properties helpful to living things, have heavy metal removal and sterilization functions, and form hexagonal water, water molecule structure of which is dense and uniform.

When such magnetized water is used, therefore, moisture may be smoothly supplied to the raw coffee beans 10. As a result, rapid germination of the raw coffee beans 10 may be induced and, at the same time, the raw coffee beans 10 may be effectively washed and sterilized with the result that propagation of germs in the raw coffee beans 10 may be effectively restricted. Consequently, acidification of the raw coffee beans 10 may be prevented.

As shown in FIG. 1, an introduction port 142 located at the upper part of the germination tank 140 may be connected to the magnetized water generator 130. The water supplied from the magnetized water generator 130 may be discharged to the water tank 110 through a discharge port 144 located at the lower part of the germination tank 140.

Figure 3:
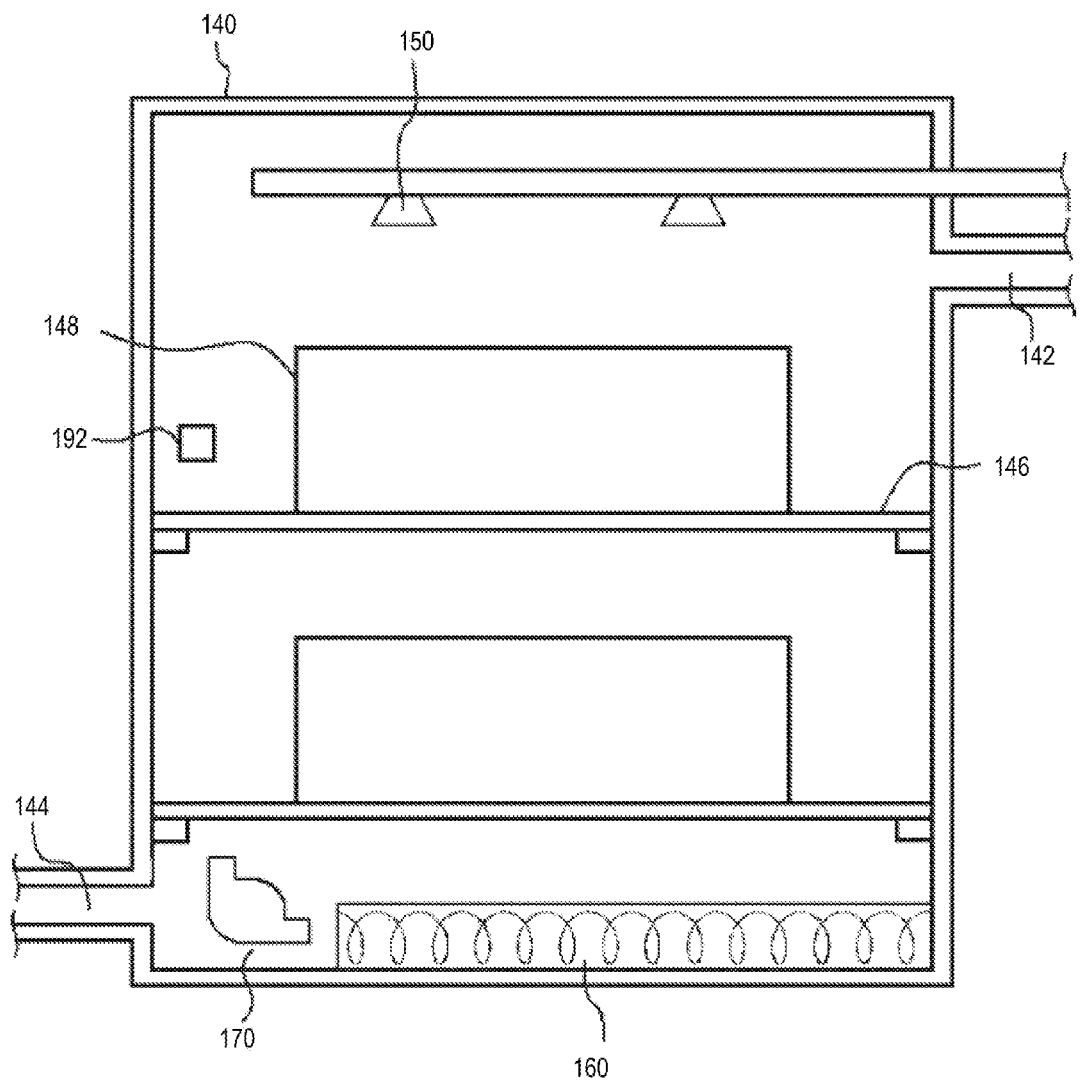
FIG. 3 is a sectional view showing the interior of a germination tank of the germination apparatus for raw coffee beans according to the first example of the present disclosure.

FIG. 3 is a sectional view showing the interior of the germination tank 140 of the germination apparatus 100 for raw coffee beans according to the first example of the present disclosure to accomplish the first object of the present disclosure.

As shown in FIG. 3, the interior of the germination tank 140 may be partitioned into a plurality of unit spaces in a vertical direction by partition walls 146. The germination containers 148, in which the raw coffee beans 10 are contained, may be disposed in the respective unit spaces. The partition walls 146 and the germination containers 148 may be configured to have a mesh structure such that water supplied to the germination tank 140 may easily pass through the partition walls 146 and the germination containers 148.

As shown in FIG. 3, the second heater 160 may be installed in the germination tank 140 to heat the interior of the germination tank 140. The second heater 160 may be operated based on interior temperature of the germination tank 140 sensed by the temperature sensor 192 installed in the germination tank 140.

When the raw coffee beans 10 are germinated, if germination environment temperature is high, germination speed is increased but germs rapidly propagate and bad smells are generated. If the germination environment temperature is low, on the other hand, propagation of germs is reduced but germination time is increased.

In this example, the germination environment temperature is adjusted and maintained such that the germination environment temperature is suitable for germination of the raw coffee beans 10 using the first heater 120 and the second heater 160. Consequently, germination speed may be increased while propagation of germs and generation of bad smells are minimized.

Figure 4:
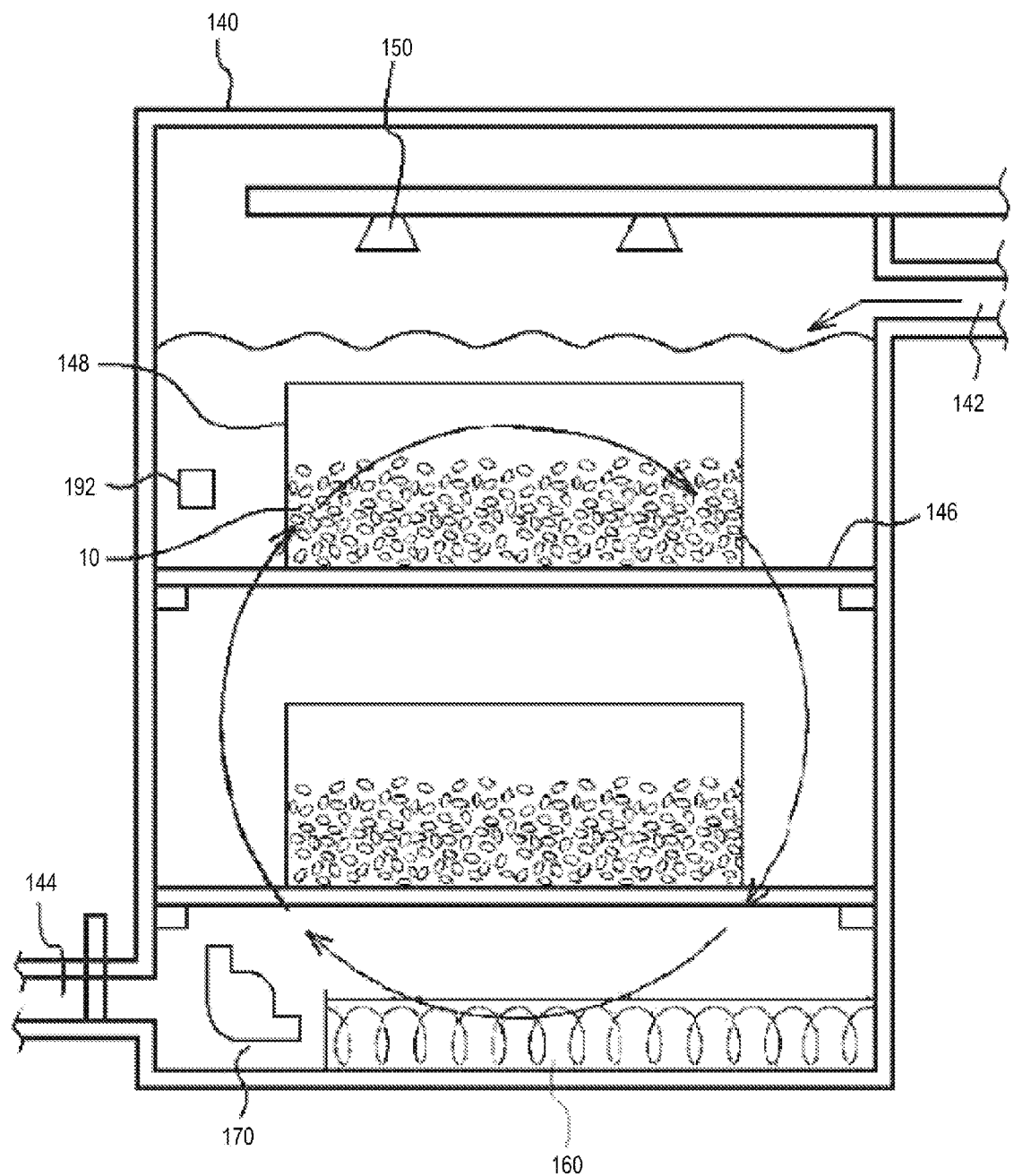
FIG. 4 is a sectional view showing a state in which water fills the germination tank of the germination apparatus for raw coffee beans according to the first example of the present disclosure.

FIG. 4 is a sectional view showing a state in which water fills the germination tank 140 of the germination apparatus 100 for raw coffee beans according to the first example of the present disclosure to accomplish the first object of the present disclosure.

In order for the raw coffee beans 10 to primarily absorb water, as shown in FIG. 4, the interior of the germination tank 140 may be filled with water supplied from the magnetized water generator 130 such that the raw coffee beans 10 are soaked in the water. In this case, the discharge port 144 of the germination tank 140 remains closed by a cover.

As shown in FIG. 4, the mixing pump 172 may be installed in the lower part of the germination tank 140. Consequently, upper and lower portions of the water filling the germination tank 140 such that the raw coffee beans primarily absorb the water may be smoothly mixed with each other while being moved downward and upward by the mixing pump 172.

As shown in FIG. 1, the shower devices 150 may be installed in the germination tank 140 such that the shower devices 150 are connected to the magnetized water generator 130 to spray water supplied from the magnetized water generator 130 into the germination tank 140.

As shown in FIG. 1, an introduction pipe, which is different from a feeding pipe connected to the introduction port 142 through which water fills the germination tank 140, may be installed in the upper part of the germination tank 140 and a plurality of shower devices 150 may be installed at the introduction pipe. Consequently, the magnetized water supplied from the magnetized water generator 130 may be sprayed into the germination tank 140 through the shower devices 150.

Figure 5:
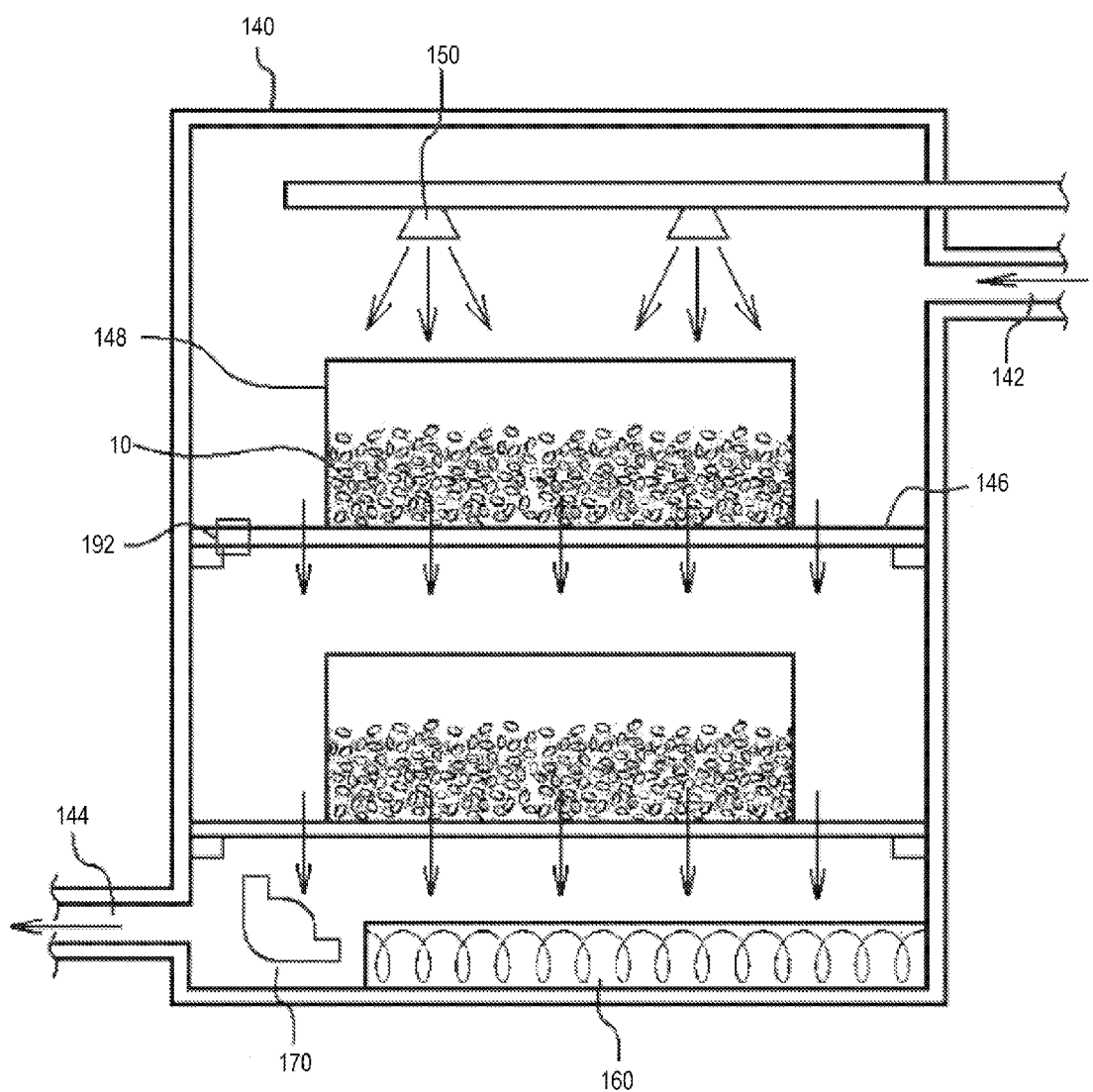
FIG. 5 is a sectional view showing a state in which water is supplied by shower devices of the germination apparatus for raw coffee beans according to the first example of the present disclosure.

FIG. 5 is a sectional view showing a state in which water is supplied by the shower devices 150 of the germination apparatus 100 for raw coffee beans according to the first example of the present disclosure to accomplish the first object of the present disclosure.

As shown in FIG. 5, the shower devices 150 installed at the introduction pipe provided in the upper part of the germination tank 140 may spray the magnetized water supplied from the magnetized water generator 130 to the raw coffee beans 10 in the germination tank 140 to wash the raw coffee beans 10, which have primarily absorbed the water filling the germination tank 140 as described above, and, at the same time, uniformly maintain humidity in the germination tank 140.

In this case, the germination containers 148 and the partition walls 146 may be configured to have a mesh structure as described above. As shown in FIG. 5, therefore, the water sprayed by the shower devices 150 may be directed to the raw coffee beans 10 in the germination tank 140 and then discharged from the germination tank 140 through the discharge port 144 located at the lower part of the germination tank 140.

As shown in FIG. 1, the switching valve 194 may be disposed between the magnetized water generator 130 and the germination tank 140 to switch a travel course of the water discharged from the magnetized water generator 130 to the germination tank 140 or the shower devices 150.

As described above, the magnetized water is introduced into the germination tank 140 through the introduction port 142 such that the water fills the germination tank 140. As a result, the raw coffee beans 10 primarily absorb the water. Subsequently, the magnetized water is sprayed into the germination tank 140 through the shower devices 150. As a result, humidity in the germination tank 140 is maintained.

In response to the above-described germination step, the switching valve 194 may switch connection among the magnetized water generator 130, the introduction port 142 of the germination tank 140, and the shower devices 150 from connection between the magnetized water generator 130 and the introduction port 142 of the germination tank 140 to connection between the magnetized water generator 130 and the shower devices 150.

The filter 180 removes impurities from the water. Activated carbon may be provided in the filter 180. As shown in FIG. 1, the filter 180 may be installed at a midway point of a channel along which the water discharged from the germination tank 140 returns to the water tank 110.

In a case in which the filter 180 is installed downstream of the germination tank 140 as described above, it is possible to effectively filter out contaminants and caffeine separated from the raw coffee beans 10 as the result of soaking the raw coffee beans 10 in high-temperature magnetized water and spraying water, thereby producing purer and cleaner germinated coffee. In addition, it is possible to prevent reduction in performance of the magnetized water due to impurities contained in the water.

In addition to the above-mentioned activated carbon, natural zeolite, composite zeolite, porous clay mineral, tourmarine, or calcium mineral may be provided in the filter 180.

As shown in FIG. 1, the drainage valve 196 may be disposed between the germination tank 140 and the water tank 110 to drain water discharged from the germination tank 140 to the outside. In a case in which the drainage valve 196 is installed downstream of the germination tank 140 as described above and is opened or closed as needed, it is possible to newly circulate pure and clean water in the germination apparatus 100 for raw coffee beans.

As shown in FIG. 1, the circulation pump 170 may be installed on a water feeding line. The circulation pump 170 may provide driving force to circulate water along the water tank 110, the magnetized water generator 130, the germination tank 140, the shower devices 150, and the filter 180.

As shown in FIG. 1, the controller 190 may be electrically connected to the first heater 120, the second heater 160, the temperature sensor 192, the shower devices 150, the mixing pump 172, the circulation pump 170, the switching valve 194, and the drainage valve 196 to control operations of these components. In a case in which the controller 190 is provided as described above, it is possible to embody an automated germination apparatus 100 for raw coffee beans.

FIGS. 6 to 9 show a germination apparatus 100 for raw coffee beans according to a second example of the present disclosure to accomplish the second object of the present disclosure.

Figure 6:
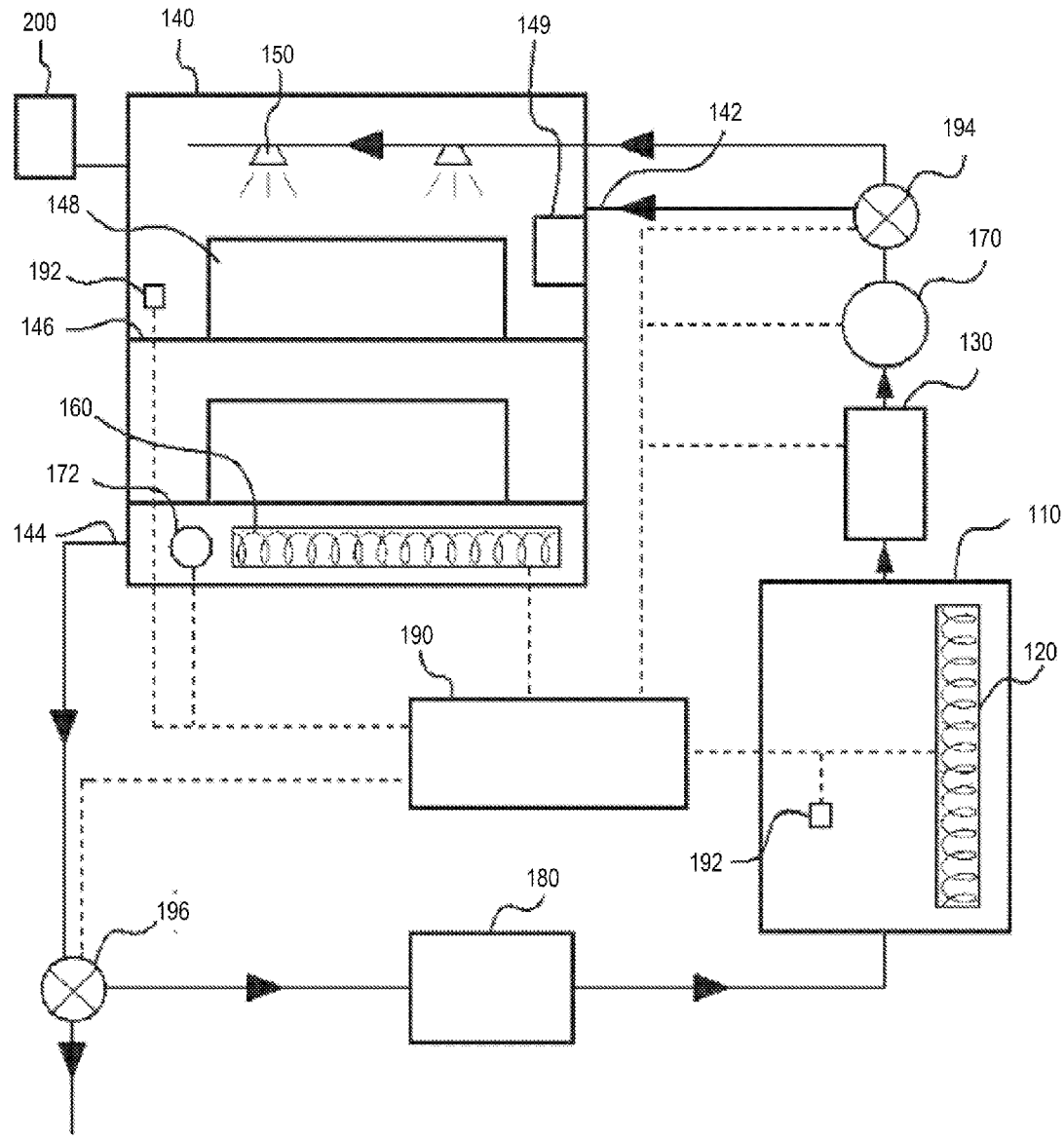
FIG. 6 is a schematic view showing a germination apparatus for raw coffee beans according to a second example of the present disclosure.

As shown in FIG. 6, the germination apparatus 100 for raw coffee beans according to the second example of the present disclosure includes a water tank 110 having a first heater 120 mounted therein, the first heater 120 heating water according to a control signal from a controller 190 in a case in which the temperature of the water is lower than reference water temperature when the temperature of the water is measured using a temperature sensor 192, a magnetized water generator 130 connected to the water tank 110 to magnetize water supplied from the water tank 110, a circulation pump 170 to circulate the magnetized water supplied from the magnetized water generator 130, a switching valve 194 to switch a channel to directly supply the magnetized water received from the circulation pump 170 into a germination tank 140 or to supply the magnetized water received from the circulation pump 170 to magnetized water dischargers 150 installed in the upper part of the germination tank 140, the germination tank 140 to receive the magnetized water from the switching valve 194 until the magnetized water fills the germination tank 140 such that raw coffee beans are fully soaked in the magnetized water to germinate the raw coffee beans, a drainage valve 196 configured to be opened or closed as needed to drain the magnetized water discharged from the germination tank 140 outside or to circulate the magnetized water discharged from the germination tank 140, a filter 180 to remove foreign matter from the magnetized water circulated via the drainage valve 196 and to supply the filtered magnetized water to the water tank 110, and a controller 190 to control operations of the first heater 120 installed in the water tank 110, the circulation pump 170, the switching valve 194, a second heater 160, a mixing pump 172, and an ultrasound generator 149 installed in the germination tank 140, and the drainage valve 196, wherein the germination tank 140 includes partition walls 146 to partition the interior of the germination tank 140 into a plurality of unit spaces, the partition walls 146 being configured to have a mesh structure, germination containers 148 installed at tops of the respective partition walls 146 to receive raw coffee beans, the germination containers 148 being configured to have a mesh structure, magnetized water dischargers 150 disposed in the upper part of the germination tank 140 to spray the magnetized water to the raw coffee beans received in the germination containers 148, the ultrasound generator 149 provided at the sidewall of the germination tank 140 to stimulate the raw coffee beans received in the germination containers 148 using ultrasound, the second heater 160 installed in the lower part of the germination tank 140 to heat water according to a control signal from the controller 190 in a case in which the temperature of the water is lower than reference water temperature when the temperature of the water is measured using the temperature sensor 192, a chitosan supply tank 200 connected to an injection port formed at the sidewall of the germination tank 140 to supply chitosan from the outside to the germination tank 140, and the mixing pump 172 to circulate the magnetized water filling the germination tank 140.

In this example, chitosan and ultrasound are used in addition to magnetized water. Consequently, it is possible to more effectively germinate raw coffee beans than in a case in which only the magnetized water is used. Hereinafter, the influence of chitosan and ultrasound on germination of raw coffee beans will be discussed.

Chitosan is a biodegradable natural polymer material which is harmless to humans. Chitosan exhibits antibacterial activity. It is known that in a case in which chitosan is applied to a plant, a self protection function, such as induction of generation of chitinase, of the plant is improved.

Chitosan is used as a material for food, cosmetics, and wastewater treatment and a medical material, such as wound healing and tissue repair. In addition, chitosan is used in various industries, such as gene delivery.

Such functions may be changed depending upon molecular weight of chitosan as well as the chemical structure of chitosan. It has been reported that as concentration of chitosan is increased, antibacterial activity of chitosan is increased. In addition, many theses on antibacterial activity of chitosan under various conditions have been reported.

According to the present disclosure, composite chitosan obtained by mixing chitosan having a molecular weight (Mw) of $4.571 \times 10^4$ and a degree of deacetylation of 84.94%, chitosan having a molecular weight (Mw) of $1.062 \times 10^5$ and a degree of deacetylation of 82.10%, and chitosan having a molecular weight (Mw) of $1.541 \times 10^5$ and a degree of deacetylation of 86.29% at a ratio of 0.5 to 1:0.5 to 1:0.5 to 1 is mixed with magnetized water filling the germination tank 140 such that concentration of chitosan mixed with the magnetized water is maintained at 0.05 to 0.1%, thereby accelerating germination of raw coffee beans and restraining propagation of germs in the raw coffee beans.

Meanwhile, ultrasound is vibration through a medium. Ultrasound is a pressure wave having a high frequency of 20 kHz or more, which cannot be heard by humans. Ultrasound is a mechanical vibration wave, which may be transmitted through a medium. In air, the speed of sound is 340 m/s. In seawater, the speed of sound is 1,500 m/s. In metals, the speed of sound is about 5,000 m/s. That is, the hardness of a material is proportional to the speed of sound therein. An electric signal is generated using an ultrasound oscillator, the generated electric signal is transmitted to a vibrator, and a wave motion is generated by the vibrator according to elasticity and inertia of the vibrator.

When such ultrasound is emitted into a liquid medium, micro cavitation bubbles are generated due to cavitation and sufficiently grown bubbles are explosively ruptured. During growth of bubbles, however, vapor from a water solution is introduced into the bubbles. In addition, energy is accumulated in the bubbles. As a result, temperature and pressure in the bubbles are greatly increased.

When sufficiently grown bubbles are explosively ruptured, high-temperature, high-pressure gas in the bubbles is instantaneously emitted, generating a shock wave. It is possible to remove foreign matter from surfaces of raw coffee beans and to stimulate the raw coffee beans such that germination of the raw coffee beans is accelerated using this action. According to the present disclosure, ultrasound of 40 kHz to 60 kHz is applied to raw coffee beans for 5 to 30 minutes under a condition that water temperature of magnetized water filling the germination tank 140 is 40.1 to 85° C. to accelerate germination of the raw coffee beans.

The ultrasound generator is a general ultrasound generation device including a vibration unit having two vibrators. Use of the ultrasound generator is not limited so long as the ultrasound generator can generate ultrasound of 40 kHz to 60 kHz.

As shown in FIG. 6, in the germination apparatus 100 for raw coffee beans according to the present disclosure, water is magnetized by the magnetized water generator 130, the magnetized water is supplied to raw coffee beans 10, germination temperature of the raw coffee beans 10 is adjusted using the first heater 120 and the second heater 160. In addition, ultrasound treatment and injection of chitosan are performed. Consequently, it is possible to effectively germinate a large amount of raw coffee beans 10 within a short period of time.

Furthermore, impurities contained in the circulated water are removed using the filter 180. Consequently, it is possible to effectively remove contaminants and caffeine from the surfaces of the raw coffee beans 10 through ultrasound treatment. In addition, it is possible to effectively prevent propagation of germs in the raw coffee beans 10. The filter 180 may be manufactured by mixing 20 to 80 wt % of nano calcium carbonate (CaCO3) of 0.05 to 2 μm and 20 to 80 wt % of yellow soil, baking the mixture in an electric furnace at 900 to 1,500° C. for 1 to 3 hours, pulverizing the baked mixture to 300 to 800 mesh, and forming the pulverized mixture into a 5 to 7 mm thick plate using a high pressure press.

Hereinafter, the respective components of the germination apparatus 100 for raw coffee beans according to the second example of the present disclosure to accomplish the second object of the present disclosure will be described in more detail with reference to FIGS. 6 to 9.

The water tank 110 stores water. As shown in FIG. 6, the first heater 120 to heat water may be installed in the water tank 110. Water is heated by the first heater 120 and the heated water, i.e. the water of increased temperature, is supplied to the germination tank 140 via the magnetized water generator 130.

In order to adjust temperature of the water, as shown in FIG. 6, the temperature sensor 192 may be installed in the water tank 110. In a case in which the temperature sensor 192 is installed in the water tank 110 together with the first heater 120 as described above, the temperature of the water may be maintained such that the temperature of the water is suitable for germination of the raw coffee beans 10.

In addition, the magnetized water in the germination tank 140 may be circulated by air generated by the mixing pump 172 installed at the bottom of the germination tank 140 with the result that temperature of the magnetized water in the germination tank 140 may be uniformly maintained.

As shown in FIG. 6, the magnetized water generator 130 may be connected to the water tank 110 to magnetize water supplied from the water tank 110. More specifically, as shown in FIG. 2, the magnetized water generator 130 may include a housing 132, through which water passes, and a plurality of permanent magnets 134 arranged along an inner circumference of the housing 132 in a circumferential direction of the housing 132.

Each permanent magnet 134 may have a magnetic intensity of 6,000 to 10,000 gauss. For example, a neodymium magnet may be used as each permanent magnet 134. Each permanent magnet 134 may be formed in a pillar shape such that each permanent magnet 134 is mounted in a corresponding groove formed in the inner wall of the housing 132. In this case, the permanent magnets 134 may be arranged such that an N pole of each permanent magnet 134 is directed to a central axis of the housing 132.

A magnetic field may be generated in the housing 132 by the permanent magnets 134 disposed in the housing 132 as described above. When water passes through the housing 132 in a state in which the water is perpendicular to the magnetic field, the water may be magnetized with the result that particles of the water may be minutely decomposed. Consequently, the molecular structure of the water may be changed and, therefore, the water may have, for example, a hexagonal water structure.

The magnetized water, generated by the magnetized water generator 130, may contain plenty of dissolved oxygen, further activate mineral ions in the water, exhibit alkaline properties helpful to living things, have heavy metal removal and sterilization functions, and form hexagonal water, water molecule structure of which is dense and uniform.

When such magnetized water is used, therefore, moisture may be smoothly supplied to the raw coffee beans 10. As a result, rapid germination of the raw coffee beans 10 may be induced and, at the same time, the raw coffee beans 10 may be effectively washed and sterilized with the result that propagation of germs in the raw coffee beans 10 may be effectively restricted.

Furthermore, propagation of germs in the raw coffee beans 10 is restricted through the use of chitosan and foreign matter is removed from the raw coffee beans 10 through ultrasound treatment. Consequently, acidification of the raw coffee beans 10 may be prevented.

In addition, nutritive value of the raw coffee beans is changed depending upon ingredients dissolved in water discharged through a discharge port 144 after germination of the raw coffee beans. For example, in a case in which valuable ingredients, such as amino acids and γ-aminobutyric acid (GABA), are dissolved in the discharged water in plenty, the nutritive value of the raw coffee beans is deteriorated.

In connection with this matter, in a case in which hot alkaline water is used to germinate the raw coffee beans, ingredients of water discharged through the discharge port 144 after germination of the raw coffee beans include water-soluble amino acids, γ-aminobutyric acid (GABA), and caffeine, which are discharged in plenty. On the other hand, weakly acidic water (pH 4.5 to 6.0) is used to germinate the raw coffee beans, it can be confirmed with the naked eye that discharge of valuable ingredients is remarkably reduced based on a color (a color approximate to black for the hot alkaline water and a color corresponding to clean water for the weakly acidic water) and concentration of water discharged through the discharge port as compared with the hot alkaline water.

As shown in FIG. 6, an introduction port 142 located at the upper part of the germination tank 140 may be connected to the magnetized water generator 130. The water supplied from the magnetized water generator 130 may be discharged to the water tank 110 through the discharge port 144 located at the lower part of the germination tank 140.

Figure 7:
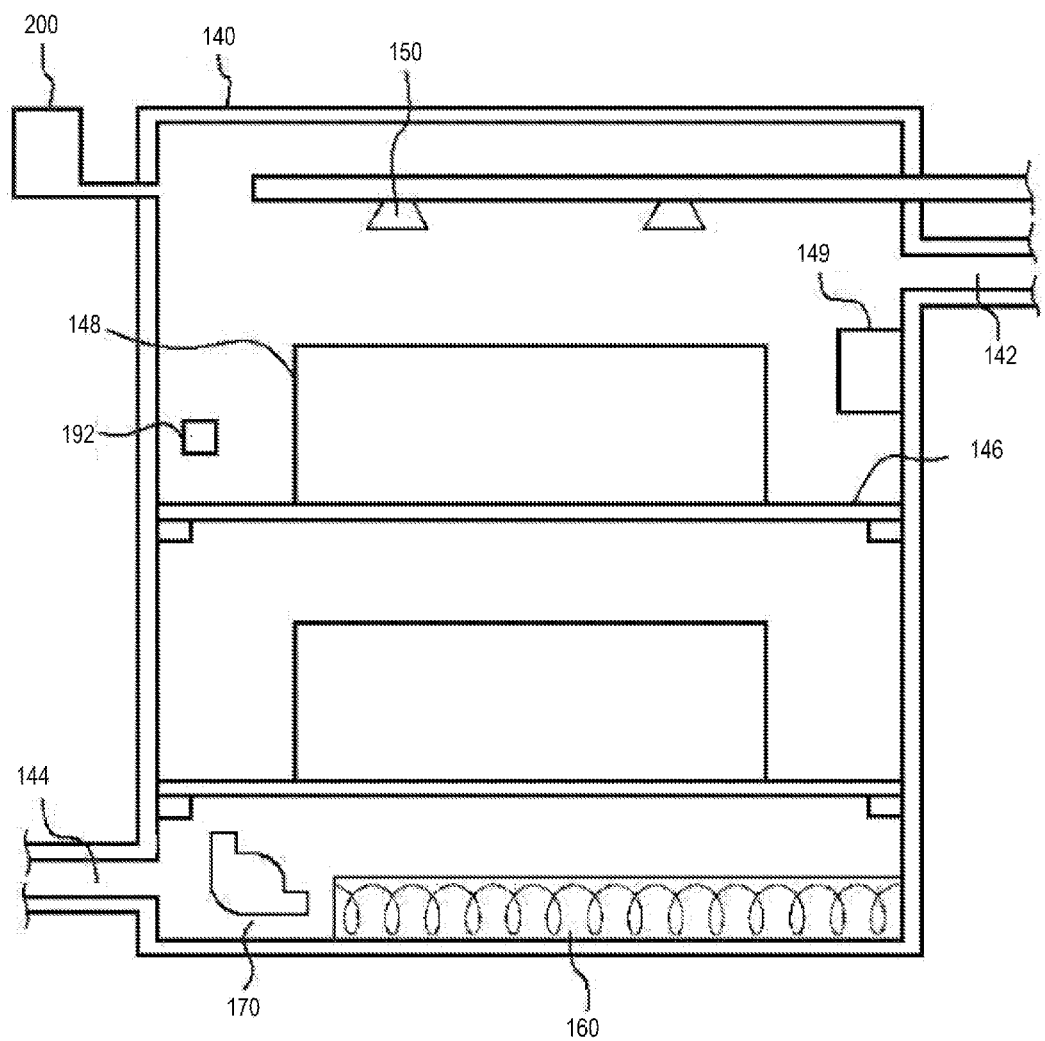
FIG. 7 is a sectional view showing the interior of a germination tank of the germination apparatus for raw coffee beans according to the second example of the present disclosure.

FIG. 7 is a sectional view showing the interior of the germination tank 140 of the germination apparatus 100 for raw coffee beans according to the second example of the present disclosure to accomplish the second object of the present disclosure.

As shown in FIG. 7, the interior of the germination tank 140 may be partitioned into a plurality of unit spaces in a vertical direction by partition walls 146. The germination containers 148, in which the raw coffee beans 10 are contained, may be disposed in the respective unit spaces. The partition walls 146 and the germination containers 148 may be configured to have a mesh structure such that water supplied to the germination tank 140 may easily pass through the partition walls 146 and the germination containers 148.

As shown in FIG. 7, the second heater 160 may be installed in the germination tank 140 to heat the interior of the germination tank 140. The second heater 160 may be operated based on interior temperature of the germination tank 140 sensed by the temperature sensor 192 installed in the germination tank 140.

The ultrasound generator 149 is installed at the sidewall of the germination tank 140 to stimulate raw coffee beans using ultrasound such that foreign matter is removed from the surfaces of the raw coffee beans and the raw coffee beans are germinated.

In addition, antibacterial effects and a germination acceleration effect are improved due to chitosan supplied from the chitosan supply tank 200 provided outside the germination tank 140.

As described above, magnetized water fills the germination tank 140, ultrasound generated by the ultrasound generator 149 installed at the sidewall of the germination tank 140 stimulates the raw coffee beans using the magnetized water as a medium. In addition, chitosan is supplied to improve the antibacterial effects and the germination acceleration effect.

Germination conditions of raw coffee beans in the germination tank 140 are as follows. In a state in which magnetized water fills the germination tank 140 such that the raw coffee beans 10 are fully soaked in the magnetized water, composite chitosan obtained by mixing chitosan having a molecular weight (Mw) of $4.571 \times 10^4$ and a degree of deacetylation of 84.94%, chitosan having a molecular weight (Mw) of $1.062 \times 10^5$ and a degree of deacetylation of 82.10%, and chitosan having a molecular weight (Mw) of $1.541 \times 10^5$ and a degree of deacetylation of 86.29% at a ratio of 0.5 to 1:0.5 to 1:0.5 to 1 is supplied into the germination tank 140 and is mixed with the magnetized water filling the germination tank 140 such that concentration of chitosan is maintained at 0.05 to 0.1%. Subsequently, ultrasound of 40 kHz to 60 kHz is applied to the raw coffee beans for 5 to 30 minutes in a state in which the water temperature is 40.1 to 85° C. to accelerate germination of the raw coffee beans. After that, the raw coffee beans are left for 2 to 8 hours such that the raw coffee beans are germinated. Consequently, it is possible to germinate the raw coffee beans within a shorter period of time than in a case in which only the magnetized water is used to germinate the raw coffee beans.

When the raw coffee beans 10 are germinated, germination speed is increased if germination environment temperature is high. At this time, however, germs may rapidly propagate. According to the present disclosure, however, it is possible to restrain propagation of germs in the raw coffee beans through the use of chitosan.

If water temperature in the germination tank 140 is low, on the other hand, propagation of germs is reduced but germination time is increased. For this reason, the water temperature in the germination tank 140 may be maintained at 40.1 to 85° C.

The water temperature in the germination tank 140 may be adjusted and maintained such that the germination environment temperature is suitable for germination of the raw coffee beans using the first heater 120 and the second heater 160. Consequently, temperature to minimize propagation of germs and generation of bad smells may be adjusted within a range in which time required to germinate the raw coffee beans can be minimized.

Figure 8:
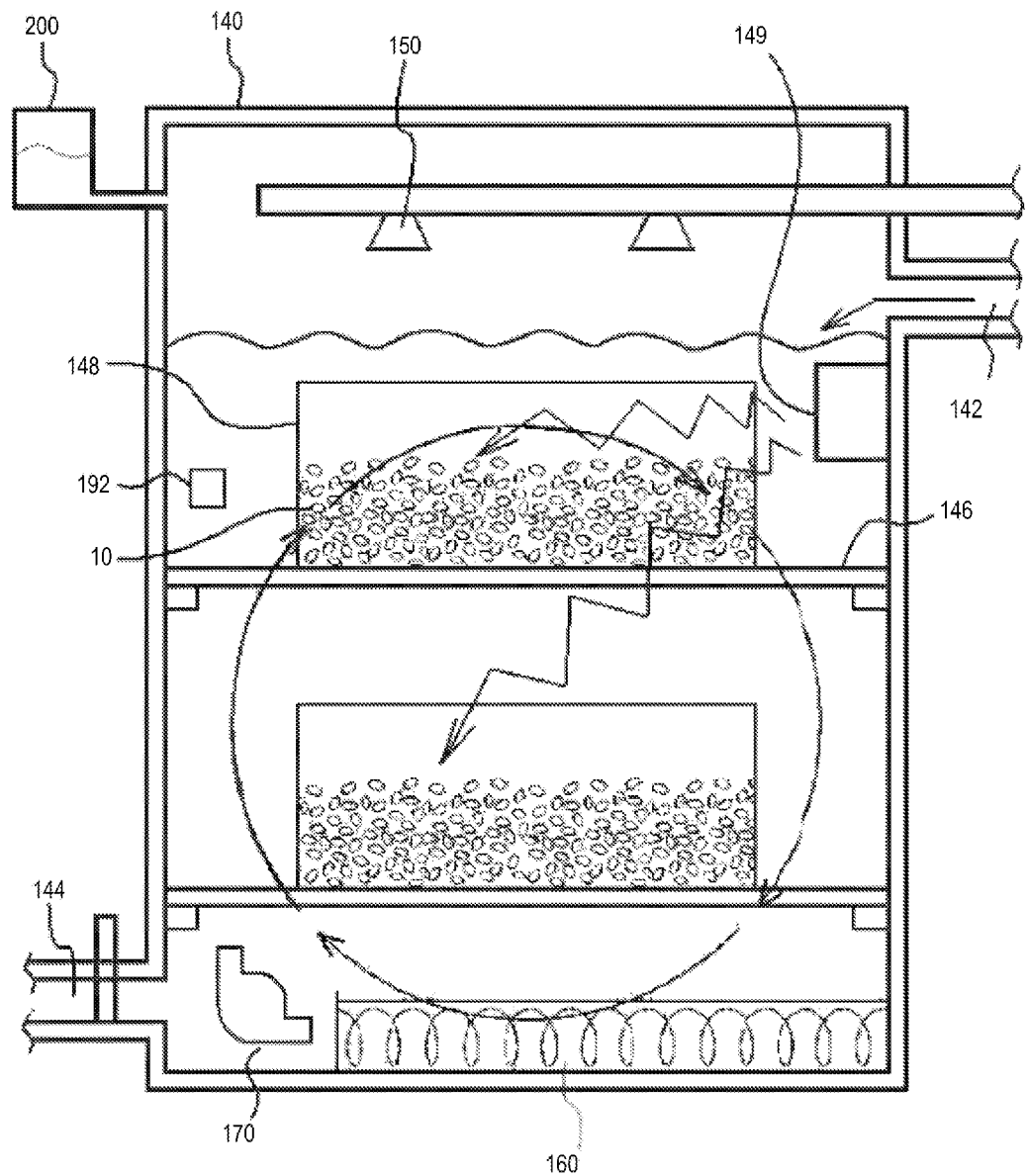
FIG. 8 is a sectional view showing a state in which water fills the germination tank of the germination apparatus for raw coffee beans according to the second example of the present disclosure.

FIG. 8 is a sectional view showing a state in which water fills the germination tank 140 of the germination apparatus 100 for raw coffee beans according to the second example of the present disclosure to accomplish the second object of the present disclosure.

In order for the raw coffee beans 10 to primarily absorb water, as shown in FIG. 8, the interior of the germination tank 140 may be filled with water supplied from the magnetized water generator 130 such that the raw coffee beans 10 are soaked in the water. In this case, the discharge port 144 of the germination tank 140 remains closed by a cover.

As shown in FIG. 8, the mixing pump 172 may be installed in the lower part of the germination tank 140. Consequently, upper and lower portions of the water filling the germination tank 140 such that the raw coffee beans primarily absorb the water may be smoothly mixed with each other while being moved downward and upward by the mixing pump 172.

As shown in FIG. 6, the magnetized water dischargers 150 may be installed in the germination tank 140 such that the magnetized water dischargers 150 are connected to the magnetized water generator 130 to spray water supplied from the magnetized water generator 130 into the germination tank 140.

As shown in FIG. 6, an introduction pipe, which is different from a feeding pipe connected to the introduction port 142 through which water fills the germination tank 140, may be installed in the upper part of the germination tank 140 and a plurality of magnetized water dischargers 150 may be installed at the introduction pipe. Consequently, the magnetized water supplied from the magnetized water generator 130 may be sprayed into the germination tank 140 through the magnetized water dischargers 150.

Figure 9:
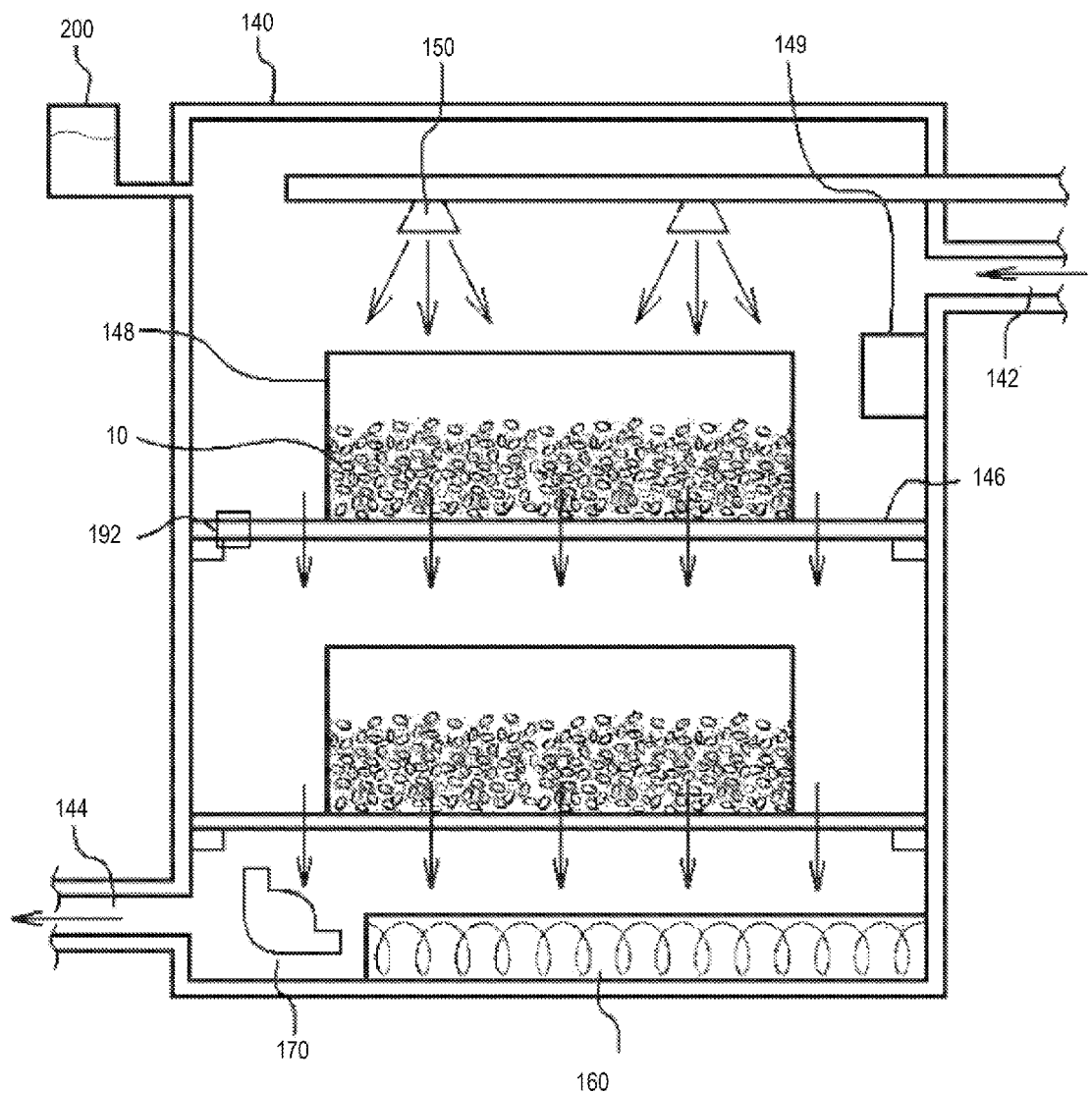
FIG. 9 is a sectional view showing a state in which water is supplied by magnetized water dischargers of the germination apparatus for raw coffee beans according to the second example of the present disclosure.

FIG. 9 is a sectional view showing a state in which water is supplied by the magnetized water dischargers 150 of the germination apparatus 100 for raw coffee beans according to the second example of the present disclosure to accomplish the second object of the present disclosure.

As shown in FIG. 9, the magnetized water dischargers 150 installed at the introduction pipe disposed in the upper part of the germination tank 140 may spray the magnetized water supplied from the magnetized water generator 130 to the raw coffee beans 10 in the germination tank 140 to wash the raw coffee beans 10, which have primarily absorbed the water filling the germination tank 140 as described above, and, at the same time, uniformly maintain humidity in the germination tank 140.

In this case, the germination containers 148 and the partition walls 146 may be configured to have a mesh structure as described above. As shown in FIG. 9, therefore, the water sprayed by the magnetized water dischargers 150 may be directed to the raw coffee beans 10 in the germination tank 140 and then discharged from the germination tank 140 through the discharge port 144 located at the lower part of the germination tank 140.

As shown in FIG. 6, the switching valve 194 may be disposed between the magnetized water generator 130 and the germination tank 140 to switch a course of the water discharged from the magnetized water generator 130 to the germination tank 140 or the magnetized water dischargers 150.

As described above, the magnetized water is introduced into the germination tank 140 through the introduction port 142 such that the water fills the germination tank 140. As a result, the raw coffee beans 10 primarily absorb the water. Subsequently, the magnetized water is sprayed into the germination tank 140 through the magnetized water dischargers 150. As a result, humidity in the germination tank 140 is maintained.

In response to the above-described germination step, the switching valve 194 may switch connection among the magnetized water generator 130, the introduction port 142 of the germination tank 140, and the magnetized water dischargers 150 from connection between the magnetized water generator 130 and the introduction port 142 of the germination tank 140 to connection between the magnetized water generator 130 and the magnetized water dischargers 150.

The filter 180 removes impurities from the water. As previously described, the filter 180 may be manufactured by mixing 20 to 80 wt % of nano calcium carbonate ($CaCO_3$) of 0.05 to 2 μm and 20 to 80 wt % of yellow soil, baking the mixture in an electric furnace at 900 to 1,500° C. for 1 to 3 hours, pulverizing the baked mixture to 300 to 800 mesh, and forming the pulverized mixture into a 5 to 7 mm thick plate using a high pressure press.

As shown in FIG. 6, the filter 180 may be installed at a midway point of a channel along which the water discharged from the germination tank 140 returns to the water tank 110.

In a case in which the filter 180 is installed downstream of the germination tank 140 as described above, it is possible to effectively filter out contaminants and caffeine separated from the raw coffee beans 10 as the result of soaking the raw coffee beans 10 in high-temperature magnetized water and spraying water, thereby producing purer and cleaner germinated coffee. In addition, it is possible to prevent reduction in performance of the magnetized water due to impurities contained in the water.

As shown in FIG. 6, the drainage valve 196 may be disposed between the germination tank 140 and the water tank 110 to drain water discharged from the germination tank 140 to the outside. In a case in which the drainage valve 196 is installed downstream of the germination tank 140 as described above and is opened or closed as needed, it is possible to newly circulate pure and clean water in the germination apparatus 100 for raw coffee beans.

As shown in FIG. 6, the circulation pump 170 may be installed on a water feeding line. The circulation pump 170 may provide driving force to circulate water along the water tank 110, the magnetized water generator 130, the germination tank 140, the magnetized water dischargers 150, and the filter 180.

As shown in FIG. 6, the controller 190 may be electrically connected to the first heater 120, the second heater 160, the temperature sensor 192, the magnetized water dischargers 150, the mixing pump 172, the circulation pump 170, the switching valve 194, and the drainage valve 196 to control operations of these components. In a case in which the controller 190 is provided as described above, it is possible to embody an automated germination apparatus 100 for raw coffee beans.

Hereinafter, a germination method of raw coffee beans using the germination apparatus for raw coffee beans according to the first example of the present disclosure to accomplish the first object of the present disclosure and the germination apparatus for raw coffee beans according to the second example of the present disclosure to accomplish the second object of the present disclosure will be described.

The germination method of raw coffee beans to accomplish the first object of the present disclosure and to accomplish the second object of the present disclosure includes a step of filling the germination containers 148 of a mesh structure installed in the germination tank 140 with raw coffee beans, a step of supplying water to the water tank 110 and heating the water using the first heater 120, a step of allowing the water supplied from the water tank 110 to pass through the magnetized water generator 130 to generate magnetized water, a step of injecting the magnetized water into the germination tank 140 such that the raw coffee beans are fully soaked in the magnetized water, and a step of germinating the raw coffee beans at a temperature of 40.1 to 85° C. for 3 to 9 hours under a condition that ultrasound is not generated and chitosan is not added or a step of applying ultrasound of 40 kHz to 60 kHz to the raw coffee beans at a temperature of 40.1 to 85° C. for 5 to 30 minutes, adding chitosan to the magnetized water filling the germination tank 140 such that concentration of chitosan mixed with the magnetized water is maintained at 0.05 to 0.1%, and germinating the raw coffee beans for 2 to 8 hours.

At the germination step, the magnetized water in the germination tank 140 is circulated by air generated by the mixing pump with the result that temperature of the magnetized water in the germination tank 140 is uniformly maintained. Circulation of the magnetized water using the mixing pump is continued until the germination step is ended.

At the germination step, water temperature of the magnetized water in the germination tank 140 is maintained at 40.1 to 85° C. If the water temperature of the magnetized water deviates from the above temperature range, germination time may be increased. For this reason, the water temperature of the magnetized water in the germination tank 140 is preferably maintained within the above temperature range.

In order to remove foreign matter from the surfaces of the raw coffee beans and stimulate the raw coffee beans such that germination of the raw coffee beans is accelerated, ultrasound of 40 kHz to 60 kHz is applied to the raw coffee beans for 5 to 30 minutes.

Chitosan has the effect of restraining propagation of germs in the raw coffee beans. In a case in which concentration of chitosan mixed with the magnetized water filling the germination tank 140 is maintained at 0.05 to 0.1%, the effect of chitosan is further improved.

As is apparent from the above description, the germination apparatus for raw coffee beans according to the present disclosure minimizes germination time of raw coffee beans through synergistic interaction between magnetized water, ultrasound, and chitosan, thereby remarkably increasing the content of γ-aminobutyric acid (GABA).

In the germination apparatus for raw coffee beans according to the first example of the present disclosure to accomplish the first object of the present disclosure, it is possible to effectively germinate a large amount of raw coffee beans within a short period of time.

In the germination apparatus for raw coffee beans according to the second example of the present disclosure to accomplish the second object of the present disclosure, it is possible to remove foreign matter from the surfaces of raw coffee beans through generation of ultrasound and to prevent germination conditions of the raw coffee beans due to propagation of germs in the raw coffee beans from being deteriorated through the use of chitosan in addition to reduction of germination time using magnetized water. As a result, it is possible to further improve germination conditions of the raw coffee beans through synergistic interaction between the magnetized water, the ultrasound, and the chitosan. At the same time, weakly acidic water is used because valuable ingredients, such as water-soluble amino acids and γ-aminobutyric acid (GABA), contained in the raw coffee beans are not dissolved in the weakly acidic water. As a result, it is possible to prevent such valuable ingredients from being discharged from the germination tank. Consequently, it is possible to reduce germination time of the raw coffee beans and to more effectively germinate the raw coffee beans, thereby remarkably increasing the content of γ-aminobutyric acid (GABA).

Although the preferred examples of the present disclosure have been disclosed for illustrative purposes, those skilled in the art will appreciate that various modifications, additions and substitutions are possible, without departing from the scope and spirit of the disclosure as disclosed in the accompanying claims.

It is not the intention of the applicants to restrict or in any way limit the scope of the appended claims to such detail. Additional advantages and modifications within the scope of the appended claims will readily appear to those sufficed in the art. The disclosure in its broader aspects is therefore not limited to the specific details, representative apparatus and methods, and illustrative examples shown and described. Accordingly, departures may be made from such details without departing from the spirit or scope of applicants' general concept.

Therefore I claim:

1. A germination apparatus for raw coffee beans comprising:
  a. a water tank having a first heater mounted therein, the first heater heating water according to a control signal from a controller in a case in which temperature of the water is lower than reference water temperature when the temperature of the water is measured using a temperature sensor;
  b. a magnetized water generator connected to the water tank to magnetize water supplied from the water tank;
  c. a circulation pump to circulate the magnetized water supplied from the magnetized water generator;
  d. a switching valve to switch a channel to directly supply the magnetized water received from the circulation pump into a germination tank or to supply the magnetized water received from the circulation pump to a magnetized water discharger installed in an upper part of the germination tank;
  e. the germination tank to receive the magnetized water from the switching valve until the magnetized water fills the germination tank such that raw coffee beans are fully soaked in the magnetized water to germinate the raw coffee beans;
  f. a drainage valve configured to be opened or closed as needed to drain the magnetized water discharged from the germination tank to an outside or to circulate the magnetized water discharged from the germination tank;
  g. a filter to remove foreign matter from the magnetized water circulated via the drainage valve and to supply the filtered magnetized water to the water tank; and
  h. a controller to control operations of the first heater installed in the water tank, the circulation pump, the switching valve, a second heater, a mixing pump, and an ultrasound generator installed in the germination tank, and the drainage valve, wherein the germination tank comprises:
  i. a partition wall to partition an interior of the germination tank into a plurality of unit spaces, the partition wall being configured to have a mesh structure;
  j. a germination container installed at a top of the partition wall to receive raw coffee beans, the germination container being configured to have a mesh structure;
  k. a magnetized water discharger provided in an upper part of the germination tank to spray the magnetized water to the raw coffee beans received in the germination container;
  l. the ultrasound generator provided at a sidewall of the germination tank to stimulate the raw coffee beans received in the germination containers using ultrasound;
  m. the second heater installed in a lower part of the germination tank to heat water according to a control signal from the controller in a case in which temperature of the water is lower than reference water temperature when the temperature of the water is measured using the temperature sensor;
  n. a chitosan supply tank connected to an injection port formed at the sidewall of the germination tank to supply chitosan from outside to the germination tank; and
  o. the mixing pump to circulate the magnetized water filling the germination tank.

2. The germination apparatus for raw coffee beans according to claim 1, wherein the magnetized water generator comprises a permanent magnet of 6,000 to 10,000 gauss mounted in a groove formed in an inner wall of a housing, the permanent magnet being disposed such that an N pole of the permanent magnet is directed to a central axis of the housing.

3. The germination apparatus for raw coffee beans according to claim 1, wherein the filter is manufactured by:
  a. mixing 20 to 80 wt % of nano calcium carbonate ($CaCO_3$) of 0.05 to 2 μm and 20 to 80 wt % of yellow soil,
  b. baking the mixture in an electric furnace at 900 to 1,500° C. for 1 to 3 hours,
  c. pulverizing the baked mixture to 300 to 800 mesh, and
  d. forming the pulverized mixture into a plate of 5 to 7 mm using a high pressure press.

* * * * *